(12) United States Patent
Mehta et al.

(10) Patent No.: US 8,308,011 B2
(45) Date of Patent: Nov. 13, 2012

(54) YOKE TYPE QUICK OPENING CLOSURE

(75) Inventors: Firdosh Mehta, Weatherford, TX (US); Donald W. Ray, Millsap, TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 1049 days.

(21) Appl. No.: 12/181,386

(22) Filed: Jul. 29, 2008

(65) Prior Publication Data

US 2010/0025404 A1  Feb. 4, 2010

(51) Int. Cl.
*B65D 45/32* (2006.01)
(52) U.S. Cl. ........ 220/320; 220/327; 220/836; 220/812; 292/299; 292/256.67
(58) Field of Classification Search .............. 220/320, 220/327, 836, 319, 325, 315, 345.1, 345.2, 220/812; 215/276; 292/299, 256, 256.6, 292/256.63, 256.67, 256.71, 256.73, 246, 292/248, 301; 49/381
See application file for complete search history.

(56) References Cited

U.S. PATENT DOCUMENTS

| | | | | |
|---|---|---|---|---|
| 3,077,360 | A | * | 2/1963 | Israel .................. 292/256.67 |
| 4,076,291 | A | * | 2/1978 | Pope et al. ............ 292/256.67 |
| 5,193,864 | A | * | 3/1993 | Coleman .............. 292/256.67 |
| 6,439,415 | B1 | | 8/2002 | Salim et al. |
| 2006/0255598 | A1 | * | 11/2006 | Berenfield et al. ..... 292/256.67 |

FOREIGN PATENT DOCUMENTS

GB  2 172 956 A  10/1986

OTHER PUBLICATIONS

Perry Equipment Corporation; "Peco Quick Opening Closure"; (May 27, 2005); 7 pages.*
PECO Perry Equipment Corporation, Quick Opening Closures, pamphlet, 4 pages; Apr. 2006.
PECO Perry Equipment Corporation, PECO Quick Opening Closure (6"-8"), Installation & Operating Instructions, 6 pages.
PECO Perry Equipment Corporation, PECO Quick Opening Closure, Installation & Operating Instructions, 7 pages.
Canadian Sale Documentation, 17 pages.

* cited by examiner

*Primary Examiner* — Mickey Yu
*Assistant Examiner* — Kareen Rush
(74) *Attorney, Agent, or Firm* — Reinhart Boerner Van Deuren P.C.

(57) ABSTRACT

A yoke type quick opening closure is provided. A torque bolt shares loads of the yoke with a drawbolt, and a separate safety bolt is provided. A common wrench interface feature is also provided.

19 Claims, 10 Drawing Sheets

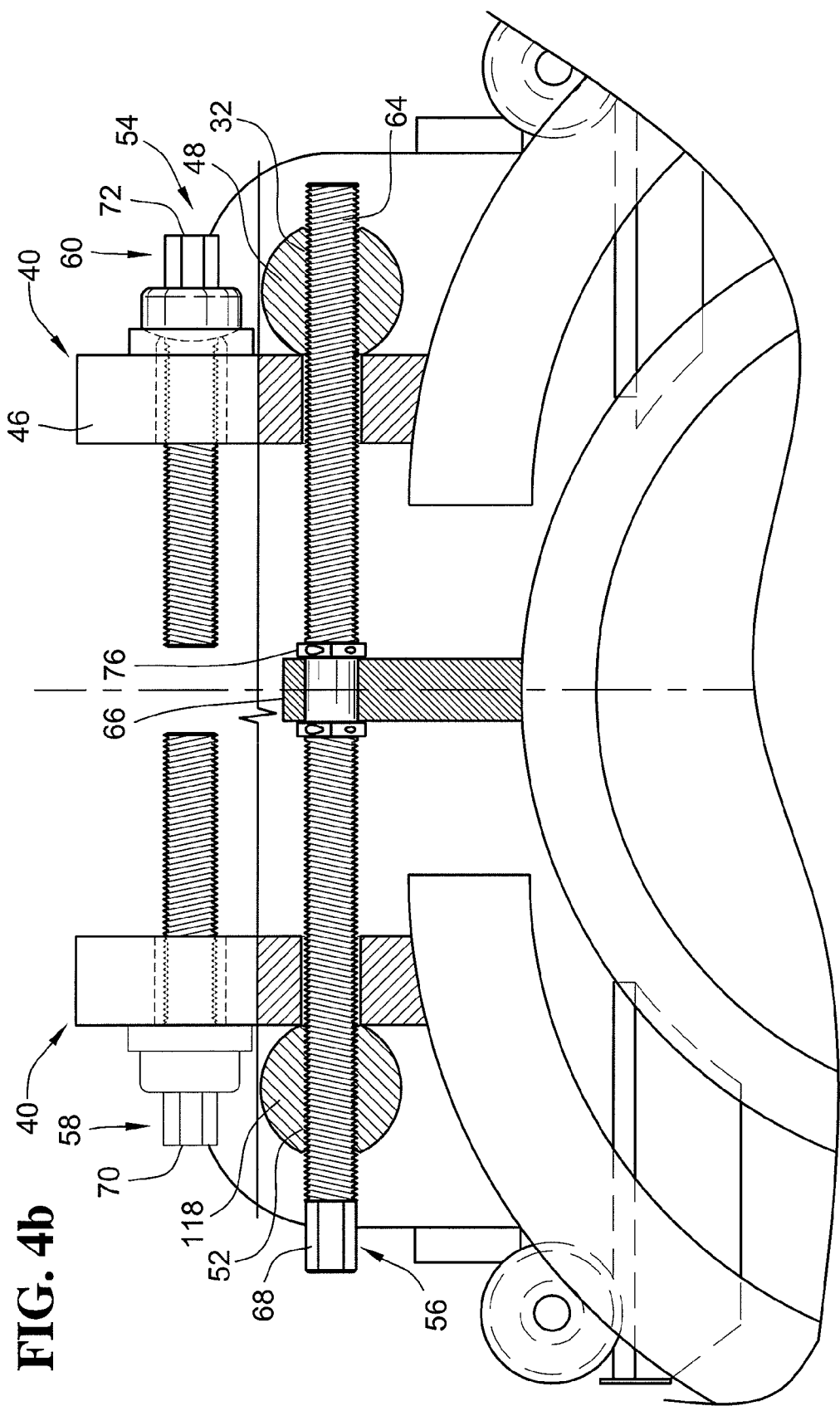

YOKE TYPE QUICK OPENING CLOSURE

FIELD OF THE INVENTION

The present invention generally relates to closure devices and more specifically relates to closures which can be quickly opened and closed to provide access to the interior contents of a pressure vessel in which there is likely to be a pressure differential across a closed opening.

BACKGROUND OF THE INVENTION

A variety of pressure vessels (including vacuum vessels) are known in the prior art which require a closure device for access. For example, such equipment includes gas filters, filter separators, gas scrubbers, pipeline scrappers, launchers and receivers, meter approvers, access openings to pressure vessels, liquid phase separators and coalescers, and the like. Such pressure vessels are often used, for example, in the oil and gas industry where it can be readily appreciated that substantial pressure loads on the order of several hundred PSIG can be generated. Equipment of the above type often features an ASME and/or API quick opening closure for access to the vessel and equipment interior.

For example, examples of quick opening type closures include U.S. Pat. No. 6,439,415 assigned to the present assignee, Perry Equipment Corporation and U.K. Patent No. GB 2172956. These patents show a closure for an equipment sub which includes a cylindrical aperture that is closed by a circular closure door member having an O ring seal. The quick opening type closures in these patents include a centralized drive hub that carries a plurality of wedge-shaped segments that are adapted to engage the equipment sub shell and thereby hold the closure head door in the closed position.

Another type of quick opening closure is a yoke-type quick opening closure as shown, for example, in a brochure entitled "Quick Opening Closures", published by the present assignee, Perry Equipment Corporation, with a date indicated of April 2006. In this type of a closure, the yoke comprises two piece yoke sections that engage the closure head and the sub shell and in which a drawbolt can be driven to engage or disengage the yoke from the closure head that can then be swung open. The safety bolt is provided in the event that the drawbolt fails. As shown therein, some of these quick opening closures include two sets of drawbolts approximate top and bottom ends of the individual yoke segments whereas other devices include two yoke segments in which one end may be joined by a hinge. The patents and publications listed above are hereby incorporated by reference in their entireties, as these patents and publications generally disclose the present state of the art.

The present invention pertains to improvements over the state of art.

BRIEF SUMMARY OF THE INVENTION

The present invention includes different aspects to which different claims are directed independently or in combination.

One aspect of the present invention is directed toward the use of common screw heads between different bolts used on a yoke-type quick opening closure. According to some embodiments, the individual bolt heads (e.g. a hex, square or other engagement fitting) may be milled into the shank forming a relief region of the drawbolt shank. An advantage of this configuration is that a single sized torque wrench may be utilized thereby avoiding the need for multiple different torque wrenches. Torque wrenches for these types of closures are specialized equipment that may cost on the order of several thousands of dollars in part due to the fact that the requisite torque such as for the drawbolt may, for example, well exceed 1,000 foot-lbs. of torque. The significant savings can be realized by providing a common wrench interface size regardless of whether there are any differences in the size or diameter of the different bolts used.

Another patentable aspect of the present invention relates to sharing the load ordinarily carried solely by the drawbolt in a quick type opening closure with one or more torque bolts. A safety bolt is additionally provided to carry the load upon failure of either of the drawbolt or the torque bolt. Several advantages can flow from this configuration. One advantage may be the use of a smaller diameter drawbolt and torque bolt and safety bolt as compared with a larger diameter drawbolt and safety bolt only. For example, in one embodiment, the shank diameter of the drawbolt may be reduced from 5 inches to 3¼ inches while having similar load carrying capacity for the overall closure structure. This can reduce weights of individual bolts which may be advantageous relative to tooling and assembly of the overall closure. Additionally, as it is desirable for only one worker in the field to be necessitated for opening and closing a device (as these are often located out in remote locations), ease of use through substantial weight reduction can be facilitated by reduction in bolt diameter. Further, substantial savings on wrenches may be achieved in that specialized wrench tooling is typically necessitated for such closures. A reduction in bolt size can result in a reduction in wrench size and therefore a cost savings on the wrenches, which may cost on the order of several thousands of dollars.

According to one independent claim, a closure for a pressure vessel comprises: a shell sub adapted for mounting to the pressure vessel, the shell sub defining an opening; a closure head sealingly engageable with the shell sub for closing the opening; a yoke having a plurality yoke sections that are movable radially outwardly and inwardly relative to the opening; and at least one securement assembly operably connected to adjacent yoke sections and operable to drive the adjacent yoke sections radially outward and inwardly, each securement assembly including: (a) a drawbolt having first and second sections of opposite hand threading, the drive bolt having a first bolt head; and (b) a second bolt, the second bolt having a second bolt head, wherein the first and second bolt heads are of a common wrench interface size.

According to another independent claim, a closure for a pressure vessel comprises: a shell sub adapted for mounting to the pressure vessel, the shell sub defining an opening; a closure head sealingly engageable with the shell sub for closing the opening; a yoke having a plurality yoke sections that are movable radially outwardly and inwardly relative to the opening, the yoke having a tightened position securing the shell sub and the closure head together; at least one securement assembly operably connected to adjacent yoke sections and operable to drive the adjacent yoke sections radially outward and inwardly, each securement assembly generating a load to facilitate the tightened position and including: (a) a drawbolt having first and second sections of opposite hand threading adapted to drive adjacent yoke sections; (b) at least one torque bolt adapted to share the load with the drawbolt; and (c) a safety bolt adapted to carry load upon failure of the drawbolt or the at least one torque bolt.

According to yet another independent claim, a closure for a pressure vessel, comprises: a shell sub adapted for mounting to the pressure vessel, the shell sub defining an opening; a pressure warning device mounted to the shell sub, the pressure warning device adapted to indicate pressure inside of the pressure vessel; a closure head engageable with the shell sub for closing the opening; a sealing ring gasket arranged between the shell sub and the closure head providing a seal when the closure head is engaged with the shell sub; a yoke having two yoke sections that are moveable horizontally outwardly and inwardly relative to the opening, the yoke having a tightened position securing the shell sub and the closure head together; a trolley system acting upon the yoke, the trolley system comprising rollers and a guide rail, the trolley system guiding horizontally inward and outward movement of the two yoke sections; a hinge oriented along a vertical axis pivotably connecting the closure head and the shell sub such that the closure head can swing horizontally outward relative to the shell sub about the vertical axis; a pair of upper support flanges, each upper support flange include a front and back plate welded to front and back sides of one of the yoke sections and an intermediate plate extending therebetween, with one upper support flange mounted proximate an upper end of one of the yoke sections and the other upper support flange mounted proximate an upper end of the other one of the yoke sections; a pair of lower support flanges, each lower support flange include a front and back plate welded to front and back sides of one of the yoke sections and an intermediate plate extending therebetween, with one lower support flange mounted proximate a lower end of one of the yoke sections and the other lower support flange mounted proximate a lower end of the other one of the yoke sections; a plurality of drive bolt slugs, one for each support flange, each drive bolt slug being carried by the support flange between front and back plates; and upper and a lower securement assemblies operably connected to adjacent yoke sections through the upper and lower support flanges, respectively, and operable to drive the adjacent yoke sections outward and inwardly, the upper securement assembly generally above the hinge and the lower securement assembly generally below the hinge, each securement assembly including: (a) a drawbolt having first and second sections of opposite hand threading adapted to drive adjacent yoke sections; (b) a torque bolt adapted to share the load with the drawbolt; (c) a safety bolt adapted to carry load upon failure of the drawbolt or the torque bolt; (d) wherein the torque bolt and the drawbolt share an equal load, each being at substantially the same torque in the tightened position; (e) wherein a vertical plane runs through the drawbolt, and wherein the safety bolt and the torque bolt are on opposite sides of the vertical plane with the drawbolt being located closer to the opening than either of the safety bolt and the torque bolt; (f) wherein the torque bolt, the safety bolt and the drawbolt each share a substantially common shank diameter that is less than 4 inches; and (g) wherein each of the safety bolt, the torque bolt and the drawbolt each have a bolt head of common wrench interface size, the bolt heads being machined milled into the shank forming a relieved region of the shank; upper and lower drawbolt collars mounted to the shell sub supporting the respective drawbolts of the upper and lower securement assemblies generally between the first and second sections of opposite hand threading; and wherein the opening defines an inner diameter that is greater than 3 feet and wherein the closure weighs in excess of 500 lbs, and is designed and configured to seal when in the tightened position to pressure loads of greater than 750 PSIG, and wherein the drawbolt and the torque bolt each have a tightened position in excess of 1000 foot-lbs of torque, and wherein the safety bolt has a tightened position less than 1000 foot-lbs of torque.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4b is a view similar to FIG. 4a, but with the yoke in the expanded released position;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1A:
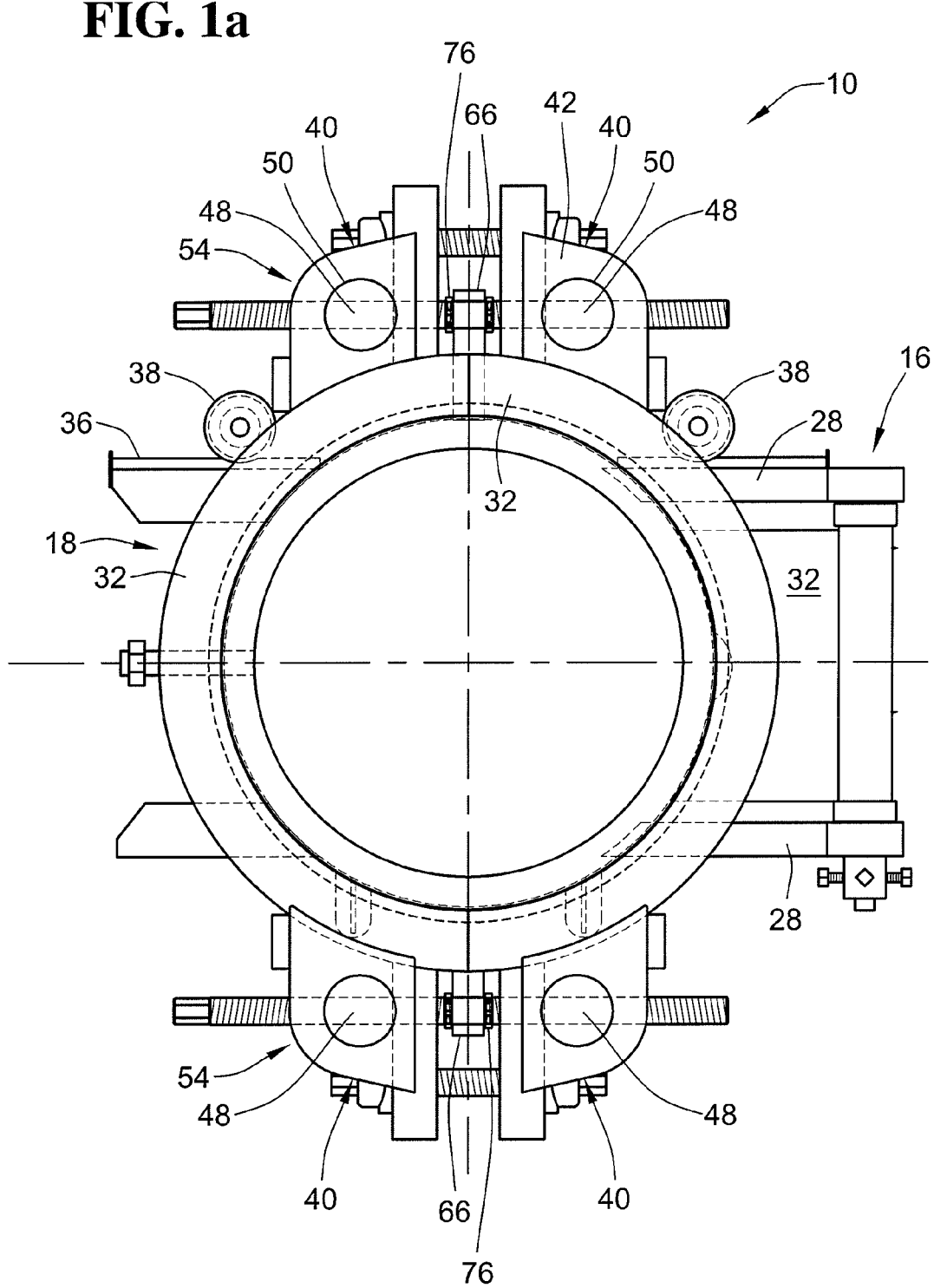
FIG. 1a is a front elevation view of a closure apparatus in accordance with an embodiment of the present invention, shown in the closed position.
Figure 1B:
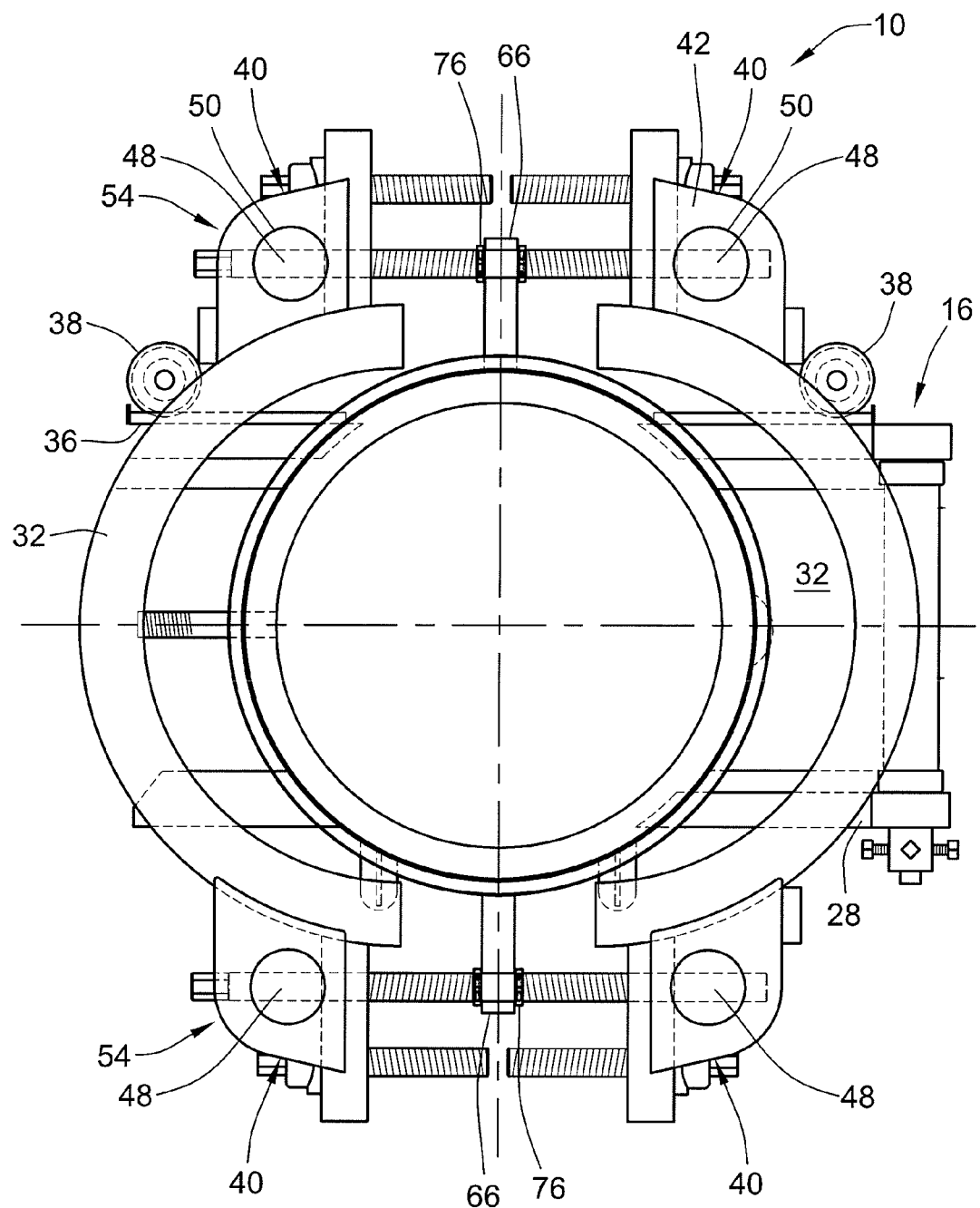
FIG. 1b, is a view similar to FIG. 1a, but with the yoke in an expanded released position.

Turning to FIG. 1, an embodiment of the present invention has been illustrated as a closure apparatus 10 which may be welded onto a suitable pressure vessel (e.g. a tank, pipeline or other enclosure which is subject to a pressure differential such as either higher or lower pressure then outside of the enclosure). The closure apparatus 10 can be quickly opened and closed for providing access to the interior of the pressure vessel for such things as inspection, filter element replacement, or other maintenance and service.

Figure 2:
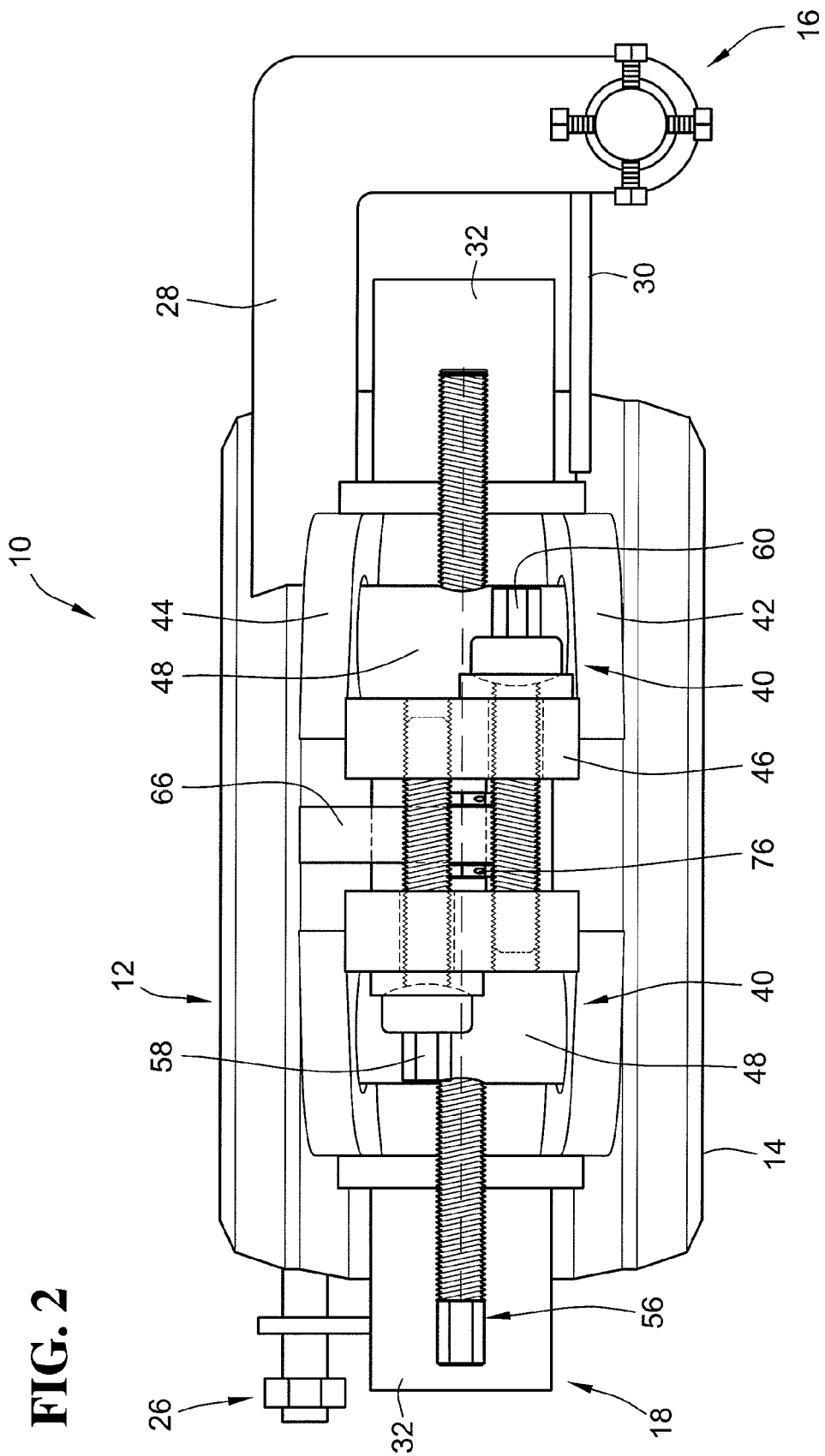
FIG. 2 is a top side view of the closure apparatus shown in FIG. 1.
Figure 3:
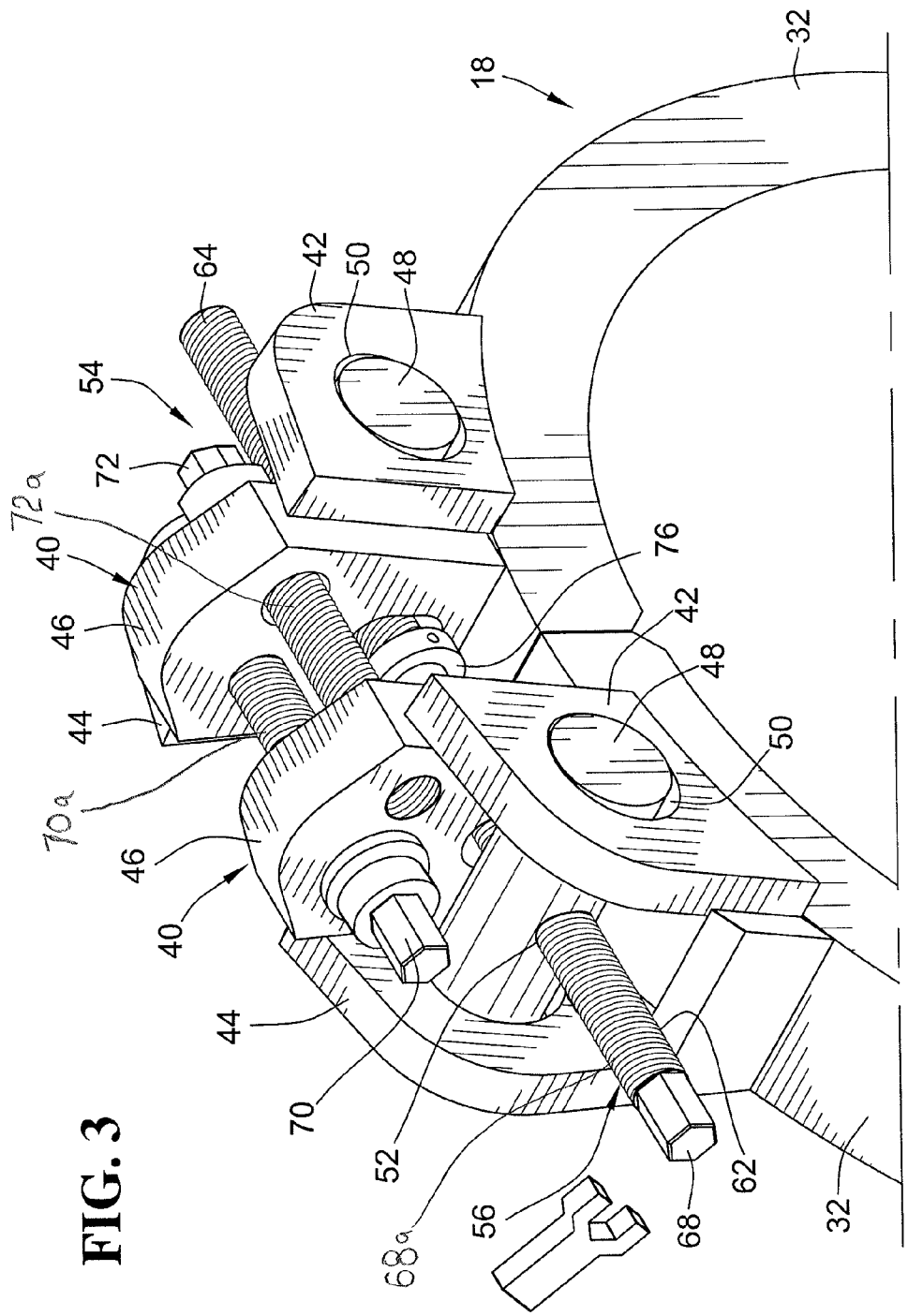
FIG. 3 is an isometric view of a top portion of the yoke assembly and the securement assemblies.
Figure 4A:
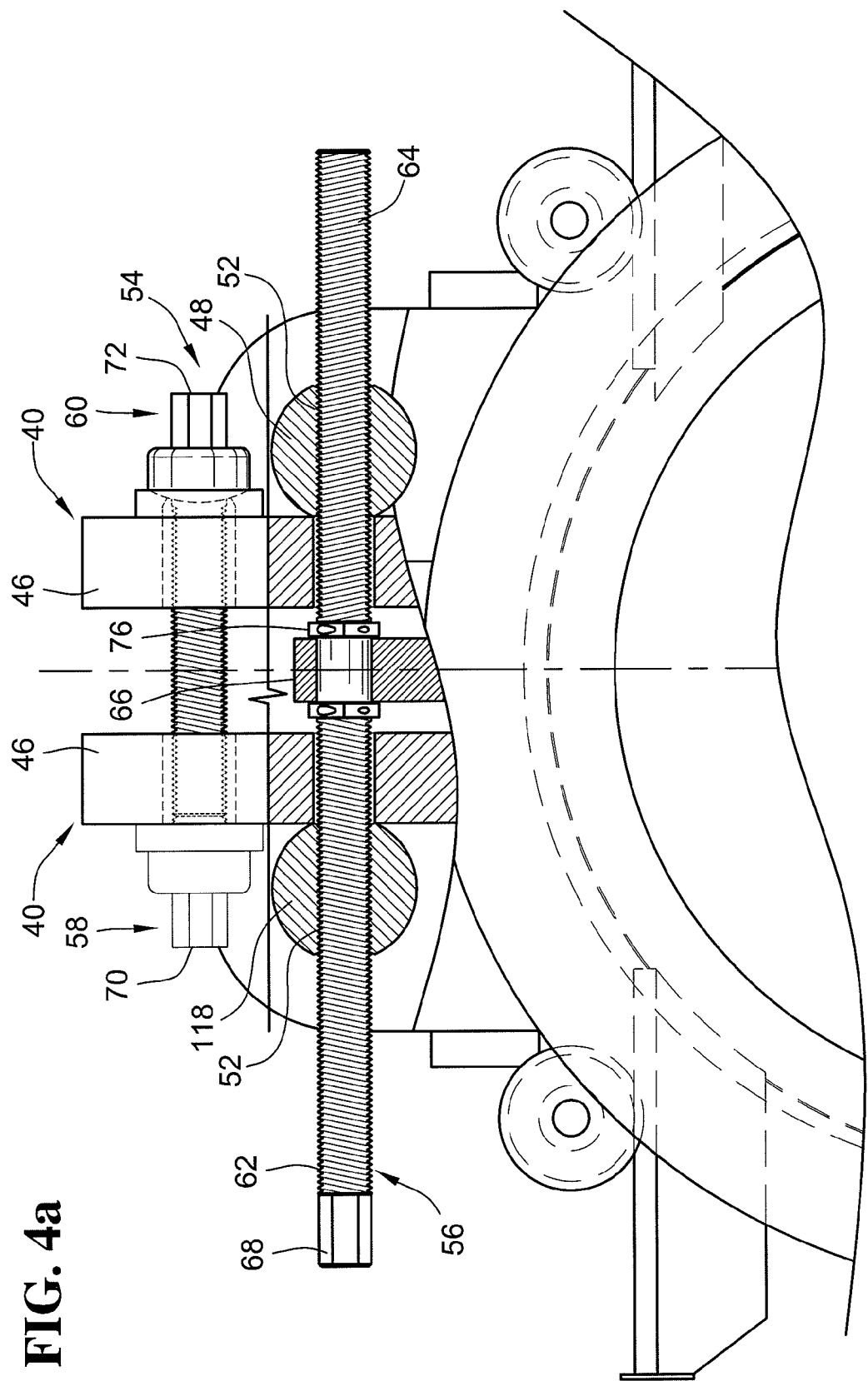
FIG. 4a is a partial cross section about a vertical plane through the draw bolt of the top part of the closure apparatus shown in FIGS. 1a and 2, being shown in the closed position.
Figure 4C:
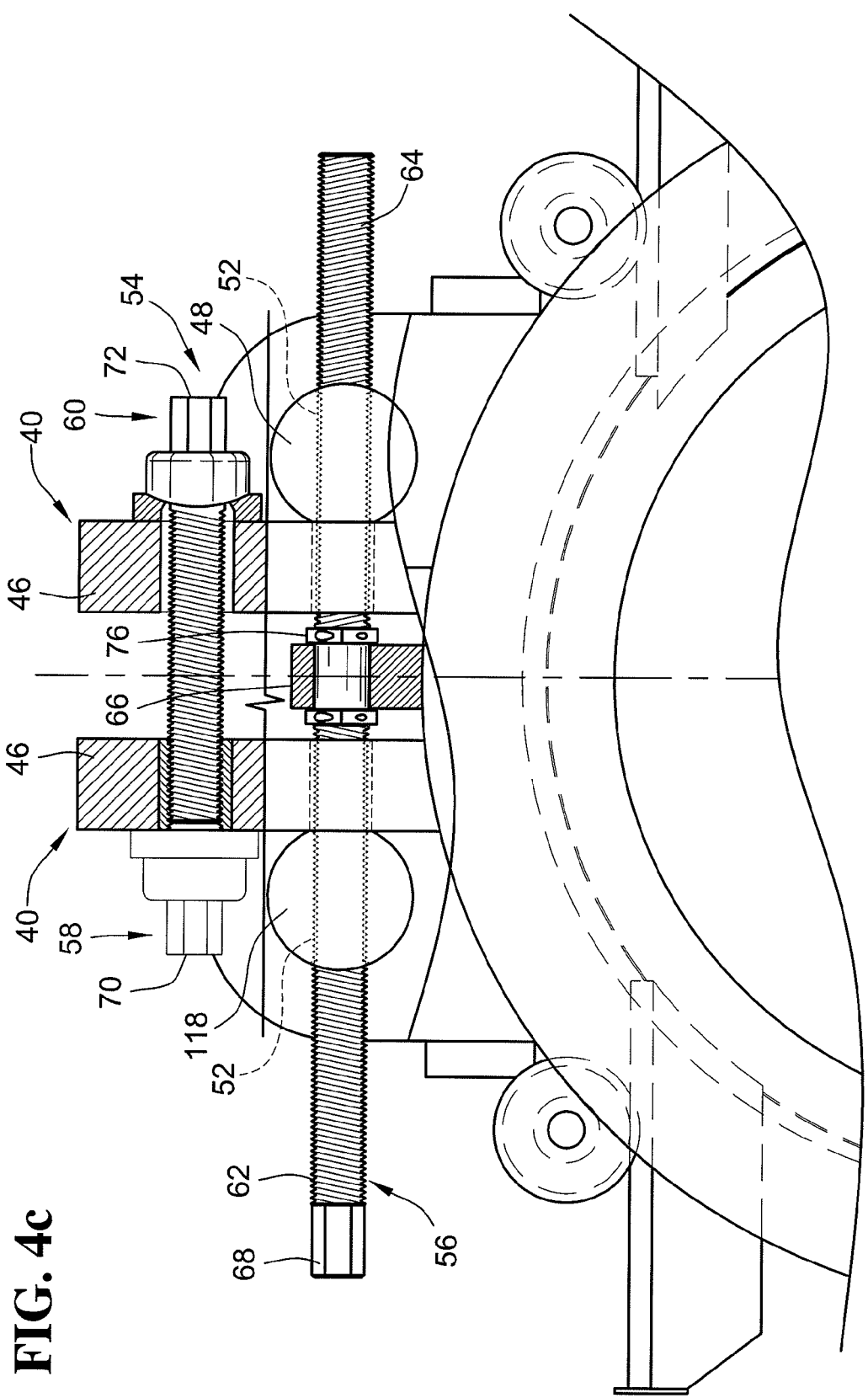
FIG. 4c is a partial cross section about a vertical plane through the safety bolt of the top part of the closure apparatus shown in FIGS. 1a and 2, being shown in the closed position.
Figure 4D:
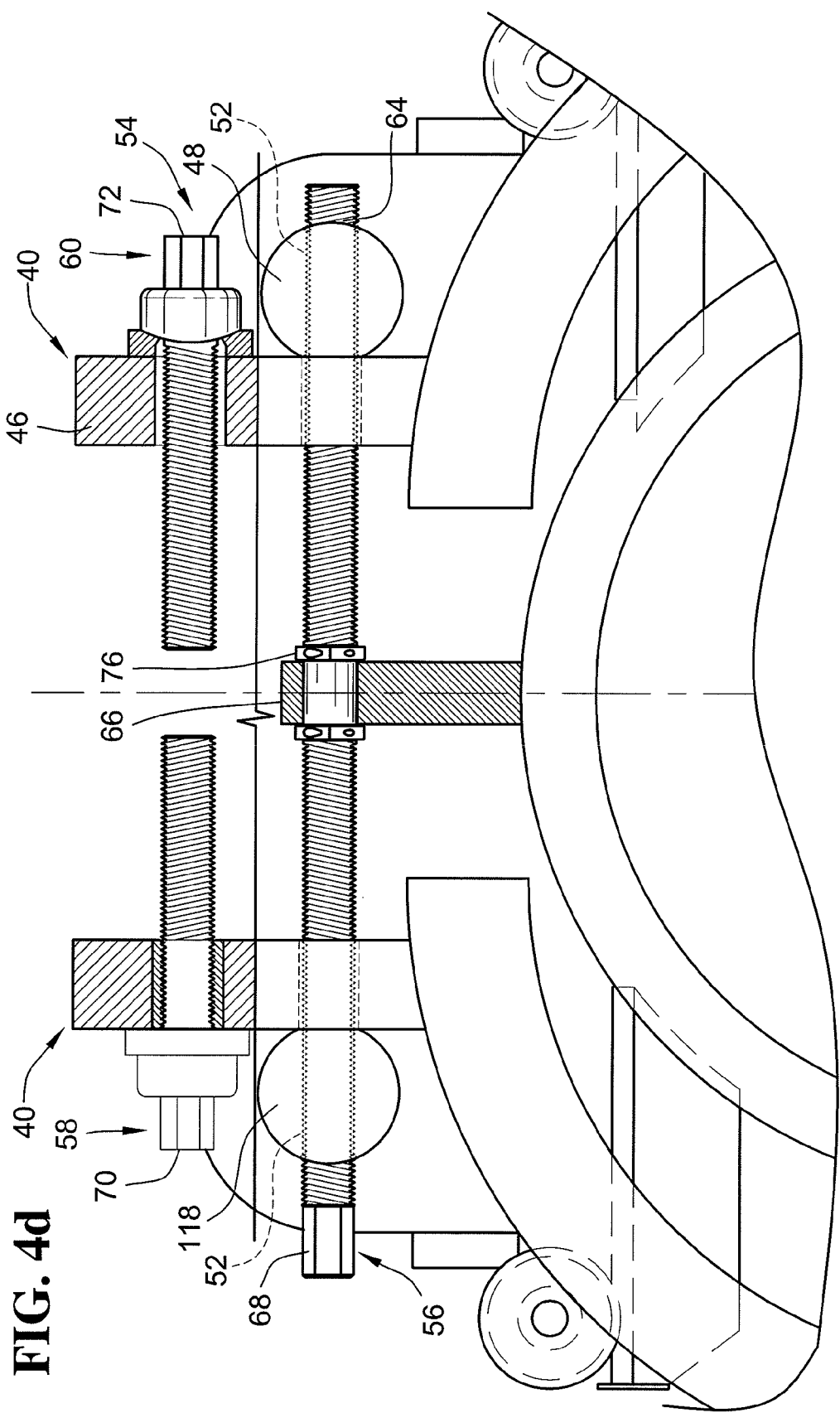
FIG. 4d is similar to FIG. 4c, but with the yoke in the expanded released position

Referring to FIGS. 1-2, the closure apparatus 10 generally includes a shell sub 12 that can be welded directly onto the pressure vessel via a circular weld seam. A closure head 14 is pivotably connected to the shell sub 12 via a hinge 16 such that the closure head 14 can act like a door and swing inwardly and outwardly relative to the shell sub 12. To maintain the closure apparatus 10 in a closed position with the closure head 14 engaged with the shell sub 12, a yoke assembly 18 is provided which generally surrounds the circular periphery of the closure head 14 and shell sub 12.

Figure 5:
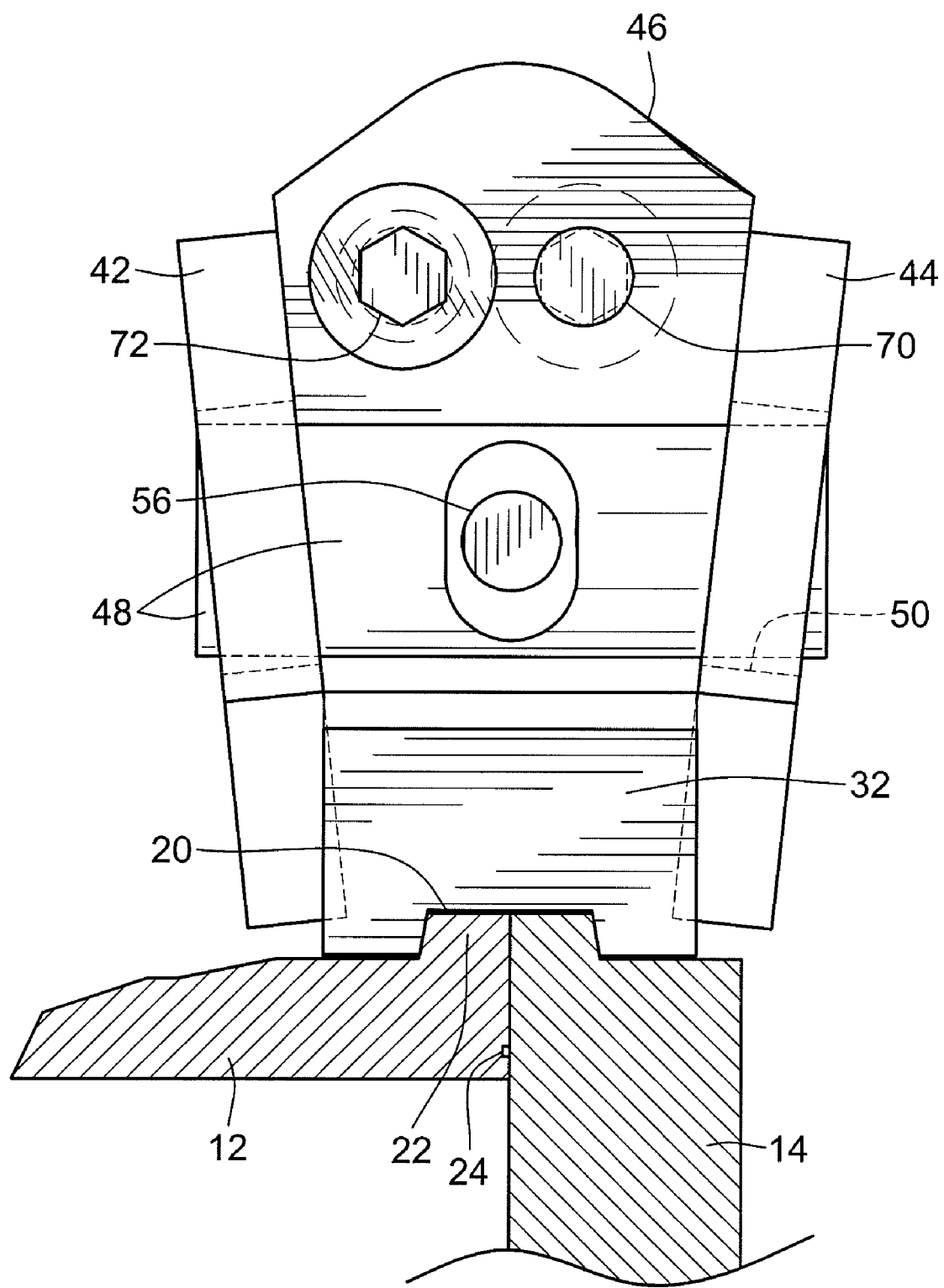
FIG. 5 is a cross section view though the yoke, the sub body and the sub head, illustrating how the yoke secures the sub body and sub head together.
Figure 6:
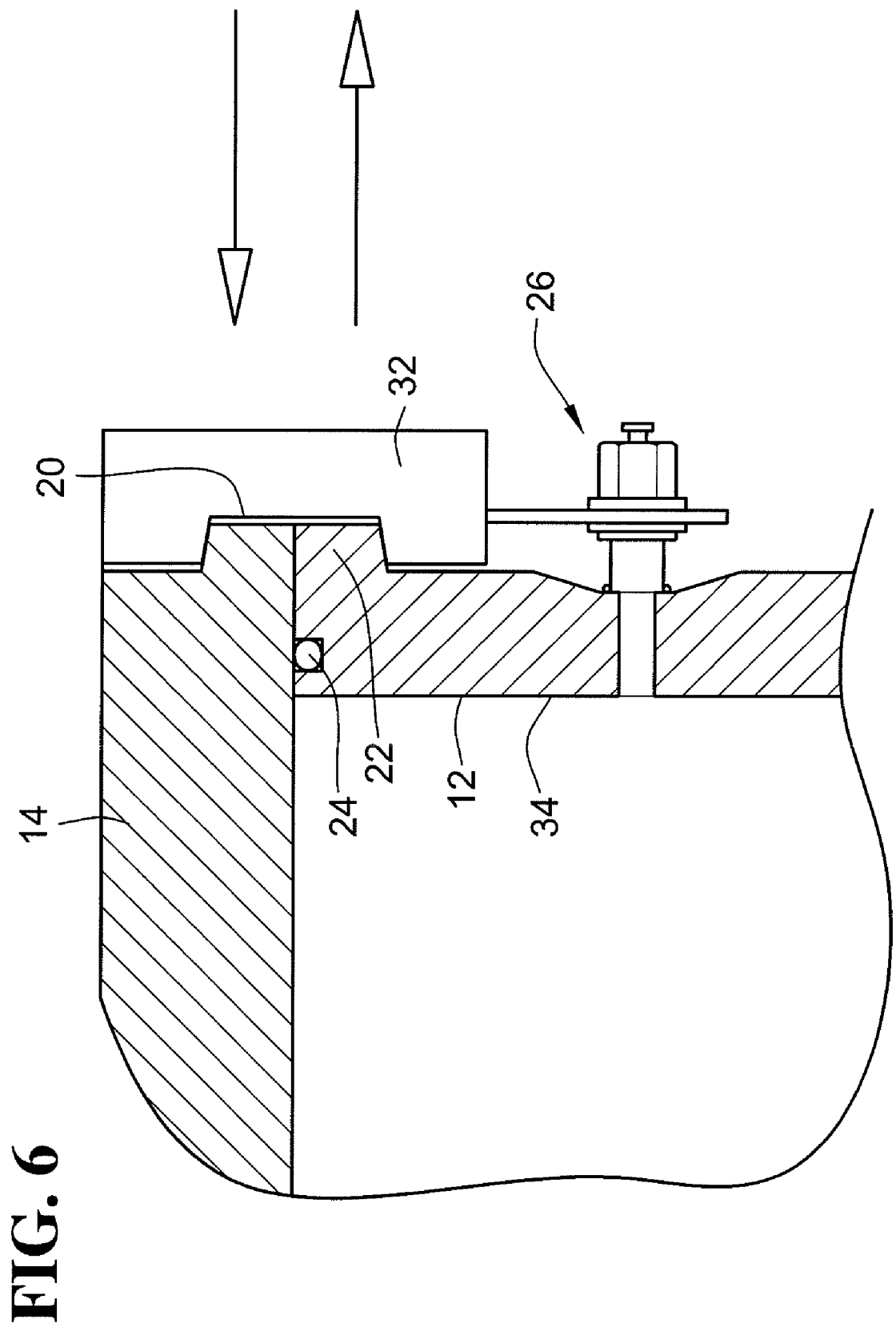
FIG. 6 is a partly schematic cross sectional illustration of part of the closure apparatus in a region of a pressure warning device.

Referring additionally to FIGS. 5-6, the yoke assembly 18 includes a wedge shaped groove 20 along its inner periphery that receives and engages with projecting annular wedge portions 22 extending from each of the shell sub 12 closure head 14. With this wedge configuration, tightening of the yoke assembly 18 and reducing the diameter thereof is operable to force the closure head 14 tightly closed against the shell sub 12.

An O-ring seal 24 is typically mounted in a circular groove formed in the shell sub 12 is arranged between the shell sub 12 and the closure head 14 to provide a seal when the closure head 14 is engaged with the shell sub 12. For many types of closure applications for which embodiments pertain, the pressure load contained within a pressure vessel, may be rated to contain pressure loads of greater than 750 PSIG and often greater than 1000 PSIG, e.g. such as in the neighborhood of 2000 PSIG. In this regard, a pressure warning device 26 is also provided and typically mounted to the shell sub 12 to indicate pressure inside of the pressure vessel to a service technician outside of the pressure vessel and/or prevent any remaining pressure contained within the pressure vessels prior to disengaging the yoke assembly 18.

The hinge 16 is mounted to the shell sub 12 by hinge arms 28 and by a hinge plate 30 to the closure head 14. Such mounting is typically accomplished via welding. As shown, preferably the hinge 16 and pivot axis thereof is oriented vertically such that the closure head 14 is openable and closable horizontally. In this manner, the mass of the door is not moved vertically, but instead horizontally allowing for easier maneuvering of the overall closure head 14.

Turning in greater detail to the yoke assembly 18, as shown in FIGS. 2-6, the yoke assembly 18 generally includes two yoke sections 32 that are movable horizontally outwardly and inwardly relative to a central opening 34 defined by the shell sub 12. Each yoke section is semi-circular in configuration with upper and lower ends of the two respective yoke sections 32 being adjacent one another. As a result, the overall yoke structure that is made up by the two or more yoke sections has an overall circular configuration in the tightened position. Each yoke section 32 defines part of the wedge shaped groove 20 which is operative to engage the wedge shaped portions 22 of the shell sub 12 and closure head 14 as mentioned above. To guide the horizontal movement of the yoke assembly 18 and its yoke sections 32, a trolley system may be provided that acts upon the yoke including a guide rail 36 and rollers 38 that are adapted to guide horizontally linear inwardly and outwardly movement of the yoke sections 32. The trolley system may also provide support when the yoke is moved to a released position in which the annular wedge shaped groove 20 is disengaged from the annular wedge portions 22 to allow for the closure head 14 to be opened relative to the shell sub 12.

As shown, the yoke assembly 18 also includes a suitable support and mounting structure in the form of four support flanges 40. The support flanges 40 may be box-like to include a pair of upper support flanges proximate the adjacent top ends of the yoke sections 32 and a pair of lower support flanges proximate the lower ends of the yoke sections 32. Each support flange 40 includes a front plate 42 and a back plate 44 which are welded to respective front and back sides of one of the yoke sections 32. The support flanges 40 also includes an intermediate plate 46 extending between and connecting the front and back plates 42, 44.

Each of the support flanges 40 carries a drive bolt slug 48 between the front and back plates 42, 44 through slug receiver holes 50 formed therein. Each drive bolt slug 48 also defines a threaded bore 52 therethrough. The threaded bore 52 for the left drive bolt slug 48 is of a different hand threading than the threaded bore 52 for the right drive bolt slug 48 for each of the upper and lower pairs, so as to mate with the suitable drawbolt 56.

Upper and lower securement assemblies 54 comprised of multiple bolts are operably connected to the adjacent upper and lower ends of the yoke sections 32. The operable connection may be accomplished through the support flanges 40 and the drive bolt slugs 48 (or alternatively other suitable such mounting structure). The securement assemblies 54 are operable to secure yoke sections together and drive the upper and lower ends of the yoke sections 32 horizontally outwardly and inwardly. The upper securement assembly 54 is above the hinge with the lower securement assembly 54 located generally below the hinge. Each securement assembly 54 includes the same components including the drawbolt 56, at least one torque bolt 58 to share torque load with the drawbolt (and preferably one torque bolt for each drawbolt), and a safety bolt 60. The drawbolt 56 has first and second sections 62, 64 of opposite hand threading that is received into the threaded bores 52 of right and left drive bolt slugs 48, respectively. As a result, the draw bolt is operable during rotation in one direction to drive the drive bolt slugs 48 horizontally outwardly away from each other; and, in the opposite reversed direction, drive the drive bolts slugs 48 horizontally inwardly towards each other. This in turn drives the yoke sections 32 outwardly and inwardly.

The torque bolt 58 is adapted to share the load with the drawbolt 56 and is adapted to be subject to a substantial torque load along with the drawbolt 56 when the yoke assembly 18 is in the tightened position keeping the closure head 14 sealingly engaged with the shell sub 12. In contrast, the safety bolt 60 is typically loaded substantially less then either of the torque bolt 58 or the drawbolt 56 and may be merely hand tightened rather than fastened with a torque wrench. The safety bolt 60 can carry the load upon failure of either the draw bolt 56 or the torque bolt 58. While different loads can be carried by the torque bolt 58 and the drawbolt 56 and different sizes can be provided, more preferably the torque bolt 58 and the drawbolt 56 share an equal load, with each being tightened at substantially the same torque in the tightened position. For example, typically the torque bolt 58 and the drawbolt 56 will be tightened to a load of greater than 750 ft.lbs. of torque, more typically in excess of 1000 ft.lbs of torque, and may reach on the order of about 2000 ft.lbs. of torque or more. In contrast, the safety bolt 60 has a tighten position substantially less than 750 ft.lbs. of torque as mentioned above is typically only hand tightened such that it carries substantially no torque load when in the tightened position. As a result, the load carried due to pressure contained within a pressure vessel is exerted upon the torque bolt 58 and the drawbolt 56 in operation. In contrast, the safety bolt 60 carries virtually none of the pressure load exerted on the closure head 14 when the closure apparatus 10 is subjected to high pressures.

As shown, the safety bolt 60 and the torque bolt 58 preferably are spaced farther away relative to the central openings 34 as compared with the drawbolt 56. Technically, the safety bolt 60 and the torque bolt 58 may therefore exert a greater moment upon the yoke, due to it being spaced farther away. While it is possible to reduce the size of either of these bolt structures relative to the drawbolt 56 while carrying the same load, more preferably, each of the torque bolt 58, the safety bolt 60 and the drawbolt 56 share a substantially common shank diameter. Preferably, the shank diameter is less then 5 inches and more preferably less then 4 inches. For example, one embodiment of the size of the shanks is 3¼ inches. With a 3¼ inch torque bolt and a 3¼ drawbolt, the overall closure apparatus 10 can carry the same amount of load and be designed for the same size, capacity and applications which were previously satisfied by a single 5 inch drawbolt. As such, a substantial reduction in drawbolt, torque bolt and safety bolt size have been accomplished with the present embodiment.

For example, according to one embodiment, the central opening 34 of the shell sub 12 may be 4 feet, and is configured in the tightened position to carry pressure loads of greater than 1000 PSIG. Often in these applications, and while it would be appreciated that smaller or larger sizes may be provided. For example, usually, but not necessarily, the central opening will be greater than 3 feet in diameter, the closure will weigh in total excess of 500 lbs. and more typically greater than 1000 lbs. (and often greater than 2000 lbs.). Each of the drawbolt 56, torque bolt 58 and safety bolt 60 preferably have a shank diameter that is typically greater than 2 inches and as mentioned above, may be greater than 3 inches.

To help support the drawbolts 56, upper and lower drawbolt arms 66 are mounted to upper and lower regions of the shell sub 12 to help support and engage central regions of the drawbolts 56 between the sections 62, 64 of opposite hand threading where a non-threaded cylindrical shank section is provided that can freely rotate within the drawbolt arms 66. There are two collars 76 on either side of the drawbolt arms 66 (top and bottom), in recessed grooves to prevent the travel of the drawbolt, so that the yokes 32 will move.

Another feature that may be provided is the provision for a common wrench interface size among the various bolt heads 68, 70 and 72 for the drawbolt 56, torque bolt 58 and safety bolt 60, respectively of each securement assembly 54. Preferably, the shank (the shanks being shown at 68a, 70a, 72a for the drawbolt 56, torque bolt 58 and safety bolt 60, respectively) of each of these bolts may have the respective bolt head formed by milling into the shank a relieved region of the shank. In other words, rather than forming an enlarged head, the heads are of a reduced size relative to the diameter. For example, for a 3¼ inch diameter bolt, the bolt head is fully contained within that diameter by milling away material from the shank to generate the bolt head. This provides for a smaller wrench interface size and thereby facilitates a smaller wrench that can be used (appreciating that sizeable and special torque wrenches are used considering the head size and torque loads for the torque bolt and drawbolt). Preferably, each of the bolt heads 68, 70 and 72 have a hexagonal interface configuration, to fit a standard wrench socket for the given size of bolts 56, 58 and 60.

It should also be noted that while the drawbolt 56 includes sections of opposite hand threading 62, 64, each of the torque bolts 58 and safety bolts 60 do not include opposite hand threading, but only threads as a normal bolt such that rotation in one direction facilitates tightening and in the other direction facilitates loosening. These bolts are not operative for driving the yoke sections 32 inwardly or outwardly, but instead for performing the respective torque and safety back up functions, respectively.

While the preferred embodiment has been illustrated in the illustrations and discussed above, there are numerous variations which are encompassed within the appended claims hereto. For example and without limiting only to these variations, it should be noted that, for example, the yoke having more than just a two yoke section 32 is possible. Additionally, a closure may incorporate only one securement assembly 54 or more then two securement assemblies 54 depending upon the configuration. For example, one of the securement assemblies 54 (e.g. group of bolts) may be replaced by some other connection mechanism such as a hinge and other embodiments, particularly for some of the smaller or less pressure intensive applications. Additionally, the common bolt interface size is particularly applicable to securement assemblies 54 where both a drawbolt 56 and a torque bolt 58 are used, and it may not be necessary for the safety bolt 60 which is hand tightened to have the same interface size (but preferable in the event one of the other bolts breaks and it is desirable to torque the safety bolt). As such, the terms "first" and "second" are not meant to identify a specific bolt, but may be used interchangeably with either the safety bolt 60 or the torque bolt 58. Only used for purposes of differentiation and distinction generally. Other embodiments are also contained within the scope of the claims appended hereto.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A closure for a pressure vessel, comprising:
    a shell sub adapted for mounting to the pressure vessel, the shell sub defining an opening;
    a closure head sealingly engageable with the shell sub for closing the opening;
    a yoke having a plurality yoke sections that are moveable radially outwardly and inwardly relative to the opening;
    at least one securement assembly operably connected to adjacent yoke sections and operable to drive the adjacent yoke sections radially outward and inwardly, each securement assembly including:

(a) a drawbolt having first and second sections of opposite hand threading, the drawbolt having a first bolt head;

(b) a second bolt, the second bolt having a second bolt head, wherein the first and the second bolt heads are of a common wrench interface size; and wherein at least one securement assembly comprises a third bolt having a third bolt head, wherein the third bolt head is of the common wrench interface size as the first and the second bolt heads.

2. The closure of claim 1, wherein the second bolt includes a shank defining threading and wherein the second bolt head is milled into the shank forming a relieved region of the shank.

3. The closure of claim 2, wherein the drawbolt includes a drawbolt shank defining the opposite hand threading and wherein the first bolt head is milled into the drawbolt shank forming a relieved region of the drawbolt shank.

4. The closure of claim 3, wherein the first bolt head and the second bolt head are both hexagonal.

5. The closure of claim 1, wherein the second bolt is a torque bolt and the third bolt is a safety bolt, the torque bolt and the drawbolt each having a tightened position in excess of 500 foot-lbs of torque, the safety bolt having a tightened position that is less than that of either of the torque bolt and the drawbolt.

6. The closure of claim 5, further comprising a hinge pivotably connecting the closure head and the shell sub, and wherein two securement assemblies are provided, an upper securement assembly generally above the hinge and a lower securement assembly generally below the hinge, and wherein the plurality of yoke sections comprises two yoke sections having adjacent upper ends and adjacent lower ends; each yoke section having a upper and lower pairs of support flanges, each support flange carrying a drive bolt slug, the drawbolt of the upper securement assembly threadingly engaging the drive bolt slugs of the upper pair of support flanges, the drawbolt of the lower securement assembly threadingly engaging the drive bolt slugs of the lower pair of support flanges, the torque and safety bolts of the upper securement assembly engaging the upper pair of support flanges, the torque and safety bolts of the lower securement assembly engaging the lower pair of support flanges, and upper and lower drawbolt collars mounted to the shell sub supporting the respective drawbolts of the upper and lower securement assemblies generally between the first and second sections of opposite hand threading.

7. The closure of claim 6, further comprising:
a pressure warning device mounted to the shell sub, the pressure warning device adapted to indicate pressure inside of the pressure vessel; and
a trolley system acting upon the yoke, the trolley system comprising rollers and a guide rail, the trolley system guiding horizontally inward and outward movement of the two yoke sections.

8. The closure of claim 6, wherein the opening defines an inner diameter that is at least 3 feet and wherein the closure weighs in excess of 500 lbs, and is designed and configured to seal when in the tightened position to pressure loads of greater than 750 PSIG, and wherein the drawbolt and the torque bolt each have a tightened position in excess of 1000 foot-lbs of torque.

9. The closure of claim 6, wherein the torque bolt, the safety bolt and the drawbolt each share a substantially common shank diameter.

10. The closure of claim 1, wherein the second bolt is a safety bolt.

11. A closure for a pressure vessel, comprising:
a shell sub adapted for mounting to the pressure vessel, the shell sub defining an opening;
a closure head sealingly engageable with the shell sub for closing the opening;
a yoke having a plurality yoke sections that are moveable radially outwardly and inwardly relative to the opening, the yoke having a tightened position securing the shell sub and the closure head together;
at least one securement assembly operably connected to adjacent yoke sections and operable to drive the adjacent yoke sections radially outward and inwardly, each securement assembly generating a load to facilitate the tightened position and including:
(a) a drawbolt having first and second sections of opposite hand threading adapted to drive adjacent yoke sections;
(b) at least one torque bolt adapted to share the load with the drawbolt; and
(c) a safety bolt adapted to carry load upon failure of the drawbolt or the at least one torque bolt.

12. The closure of claim 11, wherein at least one torque bolt comprises one torque bolt, wherein the opening defines an inner diameter that is at least 3 feet and wherein the closure weighs in excess of 500 lbs, and is designed and configured to seal when in the tightened position to pressure loads of greater than 750 PSIG, and wherein the drawbolt and the torque bolt each have a tightened position in excess of 1000 foot-lbs of torque, and wherein the safety bolt has a tightened position less than 1000 foot-lbs of torque.

13. The closure of claim 12, wherein the torque bolt and the drawbolt share an equal load, each being at substantially the same torque in the tightened position.

14. The closure of claim 11, wherein a vertical plane runs through the drawbolt, and wherein the safety bolt and the at least one torque bolt are on opposite sides of the vertical plane with the drawbolt being located closer to the opening than either of the safety bolt and the torque bolt.

15. The closure of claim 11, wherein at least one torque bolt comprises one torque bolt, wherein the torque bolt, the safety bolt and the drawbolt each share a substantially common shank diameter.

16. The closure of claim 15, wherein each of the safety bolt, the torque bolt and the drawbolt each have a bolt head of common wrench interface size, the bolt heads being machined milled into the shank forming a relieved region of the shank.

17. The closure of claim 11, further comprising a hinge pivotably connecting the closure head and the shell sub, and wherein two securement assemblies are provided, an upper securement assembly generally above the hinge and a lower securement assembly generally below the hinge, and wherein the plurality of yoke sections comprises two yoke sections having adjacent upper ends and adjacent lower ends; each yoke section having a upper and lower pairs of support flanges, each support flange carrying a drive bolt slug, the drawbolt of the upper securement assembly threadingly engaging the drive bolt slugs of the upper pair of support flanges, the drawbolt of the lower securement assembly threadingly engaging the drive bolt slugs of the lower pair of support flanges, the torque and safety bolts of the upper securement assembly engaging the upper pair of support flanges, the torque and safety bolts of the lower securement assembly engaging the lower pair of support flanges, and upper and lower drawbolt collars mounted to the shell sub supporting the respective drawbolts of the upper and lower securement assemblies generally between the first and second sections of opposite hand threading.

18. The closure of claim 15, further comprising:
a pressure warning device mounted to the shell sub, the pressure warning device adapted to indicate to the operator of pressure inside of the pressure vessel; and
a trolley system acting upon the yoke, the trolley system comprising rollers and a guide rail, the trolley system guiding horizontally inward and outward movement of the two yoke sections.

19. A closure for a pressure vessel, comprising:
a shell sub adapted for mounting to the pressure vessel, the shell sub defining an opening;
a pressure warning device mounted to the shell sub, the pressure warning device adapted to indicate pressure inside of the pressure vessel;
a closure head engageable with the shell sub for closing the opening;
a sealing ring gasket arranged between the shell sub and the closure head providing a seal when the closure head is engaged with the shell sub;
a yoke having two yoke sections that are moveable horizontally outwardly and inwardly relative to the opening, the yoke having a tightened position securing the shell sub and the closure head together;
a trolley system acting upon the yoke, the trolley system comprising rollers and a guide rail, the trolley system guiding horizontally inward and outward movement of the two yoke sections;
a hinge oriented along a vertical axis pivotably connecting the closure head and the shell sub such that the closure head can swing horizontally outward relative to the shell sub about the vertical axis;
a pair of upper support flanges, each upper support flange include a front and back plate welded to front and back sides of one of the yoke sections and an intermediate plate extending therebetween, with one upper support flange mounted proximate an upper end of one of the yoke sections and the other upper support flange mounted proximate an upper end of the other one of the yoke sections;
a pair of lower support flanges, each lower support flange include a front and back plate welded to front and back sides of one of the yoke sections and an intermediate plate extending therebetween, with one lower support flange mounted proximate a lower end of one of the yoke sections and the other lower support flange mounted proximate a lower end of the other one of the yoke sections;
a plurality of drive bolt slugs, one for each support flange, each drive bolt slug being carried by the support flange between front and back plates;
upper and a lower securement assemblies operably connected to adjacent yoke sections through the upper and lower support flanges, respectively, and operable to drive the adjacent yoke sections outward and inwardly, the upper securement assembly generally above the hinge and the lower securement assembly generally below the hinge, each securement assembly including:
(a) a drawbolt having first and second sections of opposite hand threading adapted to drive adjacent yoke sections;
(b) a torque bolt adapted to share the load with the drawbolt; and
(c) a safety bolt adapted to carry load upon failure of the drawbolt or the torque bolt;
(d) wherein the torque bolt and the drawbolt share an equal load, each being at substantially the same torque in the tightened position;
(e) wherein a vertical plane runs through the drawbolt, and wherein the safety bolt and the torque bolt are on opposite sides of the vertical plane with the drawbolt being located closer to the opening than either of the safety bolt and the torque bolt;
(f) wherein the torque bolt, the safety bolt and the drawbolt each share a substantially common shank diameter that is less than 4 inches;
(g) wherein each of the safety bolt, the torque bolt and the drawbolt each have a bolt head of common wrench interface size, the bolt heads being machined milled into the shank forming a relieved region of the shank;
upper and lower drawbolt collars mounted to the shell sub supporting the respective drawbolts of the upper and lower securement assemblies generally between the first and second sections of opposite hand threading; and
wherein the opening defines an inner diameter that is greater than 3 feet and wherein the closure weighs in excess of 500 lbs, and is designed and configured to seal when in the tightened position to pressure loads of greater than 750 PSIG, and wherein the drawbolt and the torque bolt each have a tightened position in excess of 1000 foot-lbs of torque, and wherein the safety bolt has a tightened position less than 1000 foot-lbs of torque.

* * * * *